United States Patent [19]
Streit

[11] Patent Number: 5,712,959
[45] Date of Patent: Jan. 27, 1998

[54] NEURAL NETWORK ARCHITECTURE FOR NON-GAUSSIAN COMPONENTS OF A MIXTURE DENSITY FUNCTION

[76] Inventor: Roy L. Streit, 110 Ethel Dr., Portsmouth, R.I. 02871

[21] Appl. No.: 499,243

[22] Filed: Jul. 7, 1995

[51] Int. Cl.⁶ .............................. G06E 1/00; G06F 15/18
[52] U.S. Cl. ................... 395/24; 395/22; 395/23
[58] Field of Search ................ 395/20–27; 382/155–159

[56] References Cited

U.S. PATENT DOCUMENTS

| | | | |
|---|---|---|---|
| 4,979,126 | 12/1990 | Pao et al. | 395/24 |
| 5,226,092 | 7/1993 | Chen | 382/157 |
| 5,283,855 | 2/1994 | Motomura et al. | 395/27 |
| 5,566,273 | 10/1996 | Huang et al. | 395/23 |
| 5,590,218 | 12/1996 | Ornstein | 382/157 |

*Primary Examiner*—Tariq R. Hafiz
*Attorney, Agent, or Firm*—Michael J. McGowan; William F. Eipert; Prithvi C. Lall

[57] ABSTRACT

A neural network for classifying input vectors to an outcome class, under the assumption that the outcome classes are characterized by mixtures of component populations, with each component population having a multivariate non-Gaussian likelihood distribution. The neural network comprising an input layer for receiving the components of the input vector, two hidden layers for generating an number of outcome class component values, and an output layer that identifies an outcome class in response to the outcome class component values. The first hidden layer includes a number of first layer nodes each connected receive input vector components from the input layer and generating in response a first layer output value representing a selected first layer power of the absolute value of the sum of the difference between a function of each input vector component and a threshold value. The second hidden layer includes a plurality of second layer nodes each being connected to predetermined ones of the first layer nodes and generating in response to the first layer output values an outcome class component value representing a function related to the exponential of the negative square of the sum of first layer output values. The output layer includes a plurality of output layer nodes each associated with an outcome class. Each output layer node receives the output class component values from all of the second layer nodes and uses them, in combination with respective weighting values, to generate a value that represents the likelihood that the input vector is properly classified to the output layer node's outcome class.

9 Claims, 1 Drawing Sheet

NEURAL NETWORK ARCHITECTURE FOR NON-GAUSSIAN COMPONENTS OF A MIXTURE DENSITY FUNCTION

STATEMENT OF GOVERNMENT INTEREST

The invention described herein may be manufactured by or for the Government of the United States of America for Governmental purposes without the payment of any royalties thereon or therefor.

CROSS-REFERENCE TO RELATED PATENT APPLICATION INCORPORATION BY REFERENCE

U.S. patent application Ser. No. 08/499,330 in the name of Roy L. Streit, entitled A Neural Network For Maximum Likelihood Classification With Supervised And Unsupervised Training Capability, incorporated by reference.

U.S. patent application Set. No. 08/499,245 in the name of Roy L. Streit, entitled a Neural Network Architecture for Non-Gaussian Components of a Mixture Density Function, incorporated by reference.

BACKGROUND OF THE INVENTION

1. Field of the Invention

The invention relates generally to the field of electronic neural networks, and more particularly provides a new architecture for multi-layer neural networks, that is, neural networks having a plurality of hidden layers.

2. Description of the Prior Art

Electronic neural networks have been developed to rapidly identify patterns in certain types of input data, or accurately to classify the input patterns into one of a plurality of predetermined classifications. For example, neural networks have been developed which can recognize and identify patterns, such as the identification of hand-written alphanumeric characters, in response to input data constituting the pattern of on and off picture elements, or "pixels," representing the images of the characters to be identified. In such a neural network, the pixel pattern is represented by, for example, electrical signals coupled to a plurality of input terminals, which, in turn, are connected to a number of processing nodes, each of which is associated with one of the alphanumeric characters which the neural network can identify. The input signals from the input terminals are coupled to the processing nodes through certain weighting functions, and each processing node generates an output signal which represents a value that is a non-linear function of the pattern of weighted input signals applied thereto. Based on the values of the weighted pattern of input signals from the input terminals, if the input signals represent a character which can be identified by the neural network, the one of the processing nodes which is associated with that character will generate a positive output signal, and the others will not. On the other hand, if the input signals do not represent a character that can be identified by the neural network, none of the processing nodes will generate a positive output signal. Neural networks have been developed which can perform similar pattern recognition in a number of diverse areas.

The particular patterns which the neural network can identify depend on the weighting functions and the particular connections of the input terminals to the processing nodes. The weighting functions in, for example, the above-described character recognition neural network, essentially will represent the pixel patterns which define each particular character. Typically, each processing node will perform a summation operation in connection with values representing the weighted input signals provided thereto, to generate a sum that represents the likelihood that the character to be identified is the character associated with that processing node. The processing node then applies the non-linear function to that sum to generate a positive output signal if the sum is, for example, above a predetermined threshold value. Conventional non-linear functions which processing nodes may use in connection with the sum of weighted input signals is generally a step function, a threshold function, or a sigmoid, in all cases the output signal from the processing node will approach the same positive output signal asymptotically.

Before a neural network can be useful, the weighting functions for each of the respective input signals must be established. In some cases, the weighting functions can be established a priori. Normally, however, a neural network goes through a training phase, in which input signals representing a number of training patterns for the types of items to be classified, for example, the pixel patterns of the various hand written characters in the character-recognition example, are applied to the input terminals, and the output signals from the processing nodes are tested. Based on the pattern of output signals from the processing nodes for each training example, the weighting functions are adjusted over a number of trials. After the neural network has been trained, during an operational phase it can generally accurately recognize patterns, with the degree of success based in part on the number of training patterns applied to the neural network during the training stage, and the degree of dissimilarity between patterns to be identified. Such a neural network can also typically identify patterns which are similar, but not necessarily identical, to the training patterns.

Neural networks having a single layer of processing nodes, connected to receive input signals directly, often suffice for a number of applications. However, they are often not sufficient if, for example, widely diverse or complementary input patterns would be classified into the same class. A classical example is an exclusive-OR function, in which input patterns "00" and "11" both are in the same class, that is, the class having the value "0," and input patterns "01" and "10" also are in the same class, that is, the class having the value "1." In that case, neural networks have been developed which have a plurality of layers of processing nodes, typically a maximum of two layers, between the input terminals and the output nodes. Such multi-layer neural networks are described in, for example, D. Rumelhart, et al., "Learning Internal Representations By Error Propagation", in D. Rumelhart, et al. (ed) *Parallel Distributed Processing*, page 318 (MIT Press, 1986) In such a multi-layer neural network, the processing nodes at each layer (including the output nodes, which are also processing nodes) receive weighted input signals from the processing nodes at the next lower layer (or from the input terminals in the case of processing nodes at the first, lowest layer) and generates an output signal in the same manner as described above, that is, as a non-linear step, threshold or sigmoid function of the sum of the weighted input signals. In the cases of the processing nodes in the intermediate, "hidden" layers, they transmit their output signals to the processing nodes at higher layers. A multi-layer neural network is normally trained in the same manner as a single layer network, through the application of training patterns as described above.

One of the problems with conventional neural network architectures as described above is that the training methodology, generally known as the "back-propagation" method, is often extremely slow in a number of important applications. In addition, under the back-propagation method, the neural network may result in erroneous results which may require restarting of training, and even after a neural network has been through a training phase confidence that the best training has been accomplished may sometimes be poor. This is particularly the case with a multi-layer neural network, as the weighting functions generated during the training phase often cannot be interpreted in ways that readily provide understanding of what they particularly represent.

SUMMARY OF THE INVENTION

It is therefore an object of the invention to provide a new and improved architecture for a multi-layer neural network which facilitates the ready interpretation of the architectural and design features of the neural network, including the particular non-linear functions of the nodes of the network and the weighting functions used in connection with output signals provided from each level to the next.

In brief summary, the invention provides a neural network for classifying input vectors to an outcome class, under the assumption that the outcome classes are characterized by mixtures of component populations, with each component population having a multivariate non-Gaussian likelihood distribution. The neural network comprises an input layer for receiving the components of the input layer, two hidden layers for generating a number of outcome class component values, and an output layer that identifies an outcome class in response to the outcome class component values. The first hidden layer includes a number of first layer nodes each connected receive input vector components from the input layer and generates in response a first layer output value representing a selected first layer power of the absolute value of the sum of the difference between a function of each input vector component and a threshold value. The second hidden layer includes a plurality of second layer nodes each for generating an outcome class component value, each second layer node being connected to predetermined ones of the first layer nodes and generating in response to the first layer output values generating an outcome class component value representing a function related to the exponential of the negative square of the sum of first layer output values, the sum being raised to a selected second layer power corresponding to a second layer power value divided by the first layer power. The output layer includes a plurality of output layer nodes each associated with an outcome class. Each output layer node receives the output class component values from all of the second layer nodes and uses them, in combination with respective weighting values, to generate a value that represents the likelihood that the input vector is properly classified to the output layer node's outcome class.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DESCRIPTION OF THE PREFERRED EMBODIMENT

Figure 1:
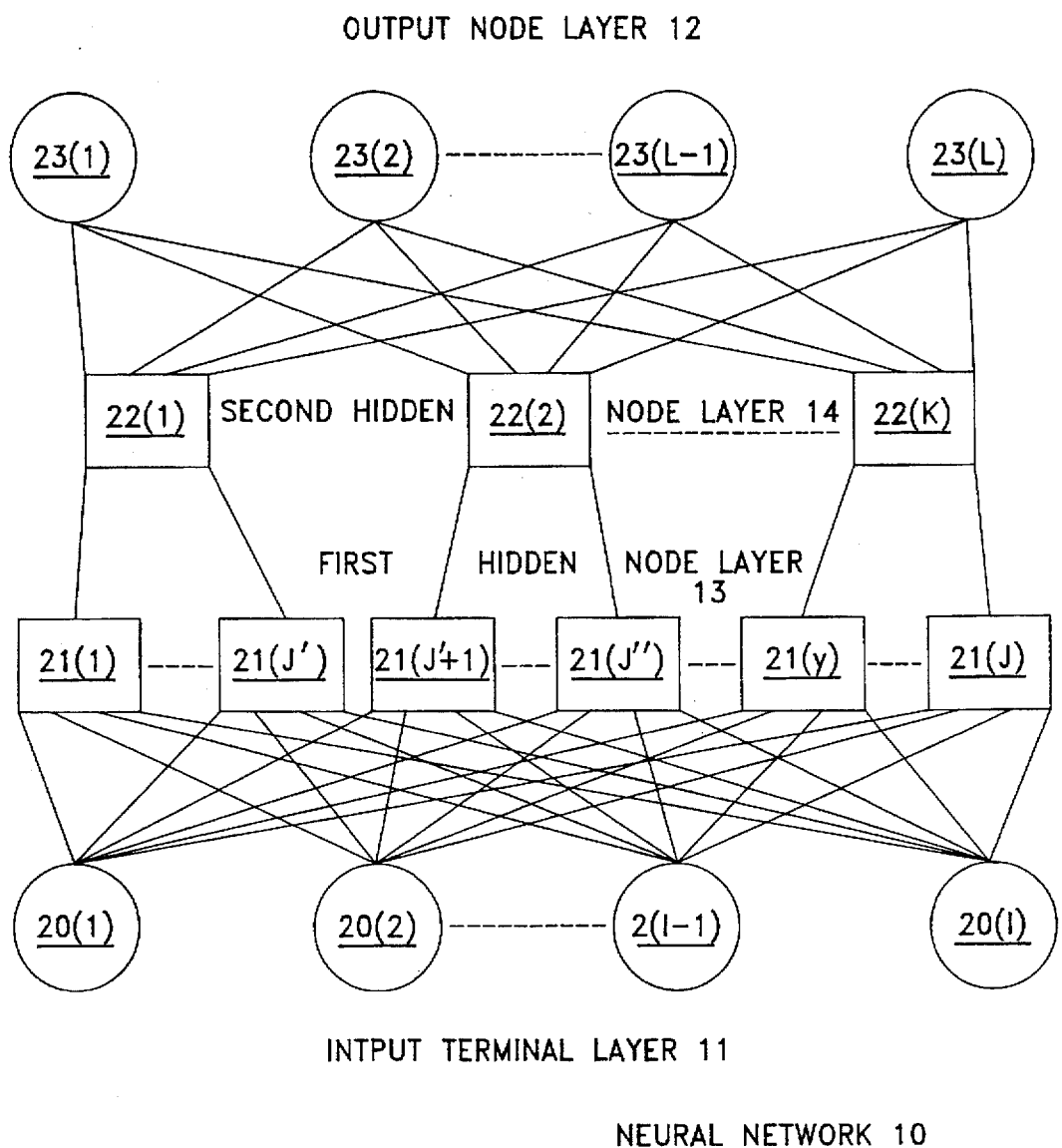
FIG. 1 is a general block diagram illustrating a first embodiment of a neural network constructed in accordance with the new architecture.

FIG. 1 depicts a general block diagram illustrating a neural network 10 constructed in accordance with the new architecture. With reference to FIG. 1, the neural network 10 includes an input terminal layer 11, an output node layer 12 and two hidden layers, including a first hidden node layer 13 and a second hidden node layer 14. The input terminal layer 11 includes a plurality of input terminals 20(A) through 20(I) [generally identified by reference numeral 20($i$)] which receive input signals representing values which will be termed as comprising components $X_i$ of an input vector X. The input terminals do no processing on the input signals, but instead pass them directly to nodes 21(1) through 21(J) [generally identified by reference numeral 21($j$)] of the first hidden node layer 13.

Each node 21($j$) of the first hidden node layer 13 generates an output signal which it couples to second layer nodes 22(1) through 22(K) [generally identified by reference numeral 22($k$)] connected thereto in the second hidden node layer 14. Each first layer node 21($j$) effectively weights the values represented by the input signals it receives according to a particular weighting value $w_1(i,j)$, generates a sum of the weighted input values and generates in response to the sum an output signal representing a value reflecting a non-linear function of the generated sum. Each weighting value $w_1(i,j)$ is determined during a training phase. All of the first layer nodes 21($j$) use the same non-linear function, which will also be described below. Each of the first layer nodes 21($j$) are connected to a particular one of the second layer nodes 22($k$), that is, for example, first layer nodes 21($l$) through 21($j'$) will be connected to second layer 22($l$), first layer nodes 21($j'$+1) through 21($j''$) will be connected to second layer node 22(2), and so forth.

Each second layer node 22($k$) of the second hidden layer 14 also generates an output signal which it couples to a plurality of output nodes 23(1) through 23(L) [generally identified by reference numeral 23($l$)] in the output node layer 12. Each second layer node 22($k$) effectively weights the values represented by the output signals it receives from the first layer nodes 21($j$) according to a particular weighting value $w_2(j,k)$, generates a sum of the weighted values and generates in response to the sum an output signal representing a value reflecting a non-linear function of the generated sum. All of the second layer nodes 22($k$) use the same non-linear function, but the non-linear function used with the second layer nodes 22($k$) differs from the non-linear function used with the first layer nodes 21($j$). In the embodiments described herein, as described below the weighting values $w_2(j,k)$ used by the second layer nodes 22($k$) are all the same, namely, "one," although as also described below the weighting values can be selected to differ from "one."

Each output node 23($l$) in output node layer 12 receives output signals from all of the nodes 22($k$) of the second hidden layer 14. Each output node also effectively weights the values represented by the output signals it receives from the nodes 22($k$) of the second hidden layer 14 connected thereto according to a particular weighting value $w_3(k,l)$, generates a sum of the weighted second layer output signals, and generates in response an output signal, constituting its contribution to the output of neural network 10, which represents a value that reflects a linear function of the generated sum. As with the weighting values $w_1(i,j)$ used by the first layer nodes 21($j$), the weighting values $w_3(k,l)$ used by the output nodes 23($l$) are determined during the training phase.

The neural network 10 classifies an input vector X under the assumption that the outcome classes are characterized by mixtures of multivariate densities, with each of the "K" component populations in the mixture having a multivariate non-Gaussian likelihood distribution. In that case, the nodes 21(j) and 22(k) of the hidden layers generate signals representing the value of the likelihood distribution for a particular component of the population in the mixture, with the signal from each node 22(k) in the second hidden layer providing the respective output node 23(l). For example, in the aforementioned exclusive-OR example, the outcome classes are "0" and "1", while the components of the outcome classes would be determined as "00," "01," "10" and "11." In that example, the nodes 22(j) and 23(k) of the first and second layers 13 and 14 will generate values identifying the likelihood that the input vector X provided to the input terminals 20(i) of the input layer 11 represents each of the respective outcome classes, that is, the probabilities that the components of the input vector X represents the respective values "00," "01," "10" and "11," while the output nodes 24(l) will generate, in response to the values provided by the nodes 24(k) of the second layer, a value identifying the outcome class "0" or "1" into which the input vector is to be classified. The following describes, first, the architectures of the hidden layers 13 and 14 and the architecture of the output layer 12.

The architecture of hidden layers 13 and 14 is characterized by (1) the non-linear functions and any thresholds used by the nodes 21(j) and 22(k) in the hidden layers 13 and (2) the numbers of nodes 21(j) in the first hidden layer 13 and the numbers of nodes 22(k) in the second hidden layer 14, (3) the interconnection weights $w_1(i,j)$ used by the nodes 21(j) in the first hidden layer 13, and (4) the interconnection weights $w_2(j,k)$ used by the nodes 22(k) in the second hidden layer.

Forms for each of these architectural elements are described below, although it should be appreciated that actual values for at least some of them will be determined during training of the neural network 10.

As noted above, the nodes 21(j) and 22(k) of the first and second hidden layers 13 and 14 generate signals representing the value of the likelihood distribution for a particular component of the population in the mixture, with the signal from each node 22(k) in the second hidden layer providing the likelihood value for one of the components in the population. Each of the components in the population is assumed to be conditionally independent (statistically) of the others, and so the architecture of each node 22(k) in the hidden layer 14 and the nodes 21(j) in the first hidden layer connected thereto, can be expressed independently of the others. However, it will be assumed that all of the probability density functions have the same general expressions, with the differences being the specific values applied to the respective expressions to train the neural network 10 for a particular application. Accordingly, for a node 22(k) in the hidden layer 14, if the set of possible input vectors X which may be input to the input layer 11 has a mean, or average, vector "u" (that is, the vector "u" has components $u_i$, "i" being an index identifying the component of the vector, each component $u_i$ corresponding to the average value of the component $X_i$ with the same index "i" of the set of possible input vectors X), the signals from a second layer node 22(k) will represent a value that conforms to a likelihood function corresponding to:

$$p(X) = ke^{-[\int(X-u)s^T W(s) dS_N(s)]^{\frac{1}{\nu}}} \quad (1)$$

where "k," "η" and "ν" are constants with values greater than "zero" and "T" represents the matrix/vector transpose operation. In addition, in equation Eqn. 1, $S_N$ represents a unit sphere, that is, a sphere of radius "one" in N-dimensional space [where "N" is the number of input terminals 20(i)], which, in turn, is defined to correspond to the set of all vectors X whose Euclidean length is "one", s is a vector normal to the surface of unit sphere $S_N$ and a differential of surface of the unit sphere $S_N$ is denoted "$dS_N(s)$," W(s) is a weighting function, and the integral is a surface integral over the unit sphere $S_N$. The constant "k" is selected as a normalizing value, so that the integral of the likelihood function, equation Eqn. 1, over the entire range of values which input vector "X" may take on, equals one. The integral in Eqn. 1 is a surface integral over the surface of the unit sphere $S_N$.

For the likelihood function represented by equation Eqn. 1, the value of constant η can be uniquely determined by setting the mean vector "u" equal to zero and solving the equation $$\text{Log}[p(\alpha x)] \equiv k \alpha^\beta \text{Log}\left[\frac{p(X)}{k}\right] \quad (2)$$

where "log" is the logarithm function and "α" is any real scalar value.

The weighting function W(s), and constants "k" and "ν" are not necessarily unique. An arrangement for determining a weighting function W(s) and the constants "k" and "ν" will be described below. Initially, however, will be presented several observations. First, the likelihood function p(X) presented in equation Eqn. 1 is symmetric about the mean vector "u," that is, $$p(X-u)=p(-(X-u))=p(-X+u) \quad (3)$$

In addition, it is possible to require that the weighting function W(s) also be symmetric, that is, that $W(s)=W(-s)$ for all "s." This follows from the fact that if an unsymmetric weighting function $W_u(s)$ is selected, a symmetric weighting function $W_s(s)$ can be constructed therefrom as $$W_s(s) = \frac{W_u(s) + W_u(-s)}{2} \quad (4)$$

Accordingly, the weighting function W(s) can be assumed to be symmetric.

The surface integral in equation Eqn. 1 can be approximated in a discrete manner using an "H"-element grid "E" over the unit sphere, where "E" denotes the collection of surface elements (i.e., distinct points on the unit sphere) represented by unit vectors $s_j$ ("j" is an index from 1 to H) or $$E=\{s_1, \ldots, s_H\} \quad (5)$$

where the surface elements "$s_j$" (representing vectors orthogonal to the actual surface elements of the unit sphere) are distributed over the unit sphere $S_N$ in accordance with weights $\{\Delta_1, \ldots, \Delta_H\}$ selected corresponding to a quadrature rule designed for integration on the unit sphere $S_N$. In that case, equation Eqn. 1 translates into $$p(x) \approx ke^{-\left[\sum_{j=1}^{H} \Delta_j x^T s_j - u^T s_j \right]^{\nu} W(s_j)\right]^{\frac{\eta}{\nu}}} \quad (6)$$

The particular non-linear functions and thresholds used by the nodes 21(j) and 22(k) of the hidden layers 13 and 14 can be readily deduced by inspection of equation Eqn. 6. Since the variables to be deduced during training are given generally by summation in equation Eqn. 6, using the dummy variable "x" to represent the "$X^T s_j - u^T s_j$" in equation Eqn. 6, the non-linear function used with the nodes 21(j) of the first hidden layer can be selected to be $$h_1^v(x) = |x|^v \tag{7}$$

where "$|x|$" is the absolute value function for variable "x." With the equation Eqn. 7 selected for the non-linear function for the nodes 21(j) of the first hidden layer, the non-linear function selected for the nodes 22(k) of the second hidden layer is, from equation Eqn. 6

$$h_2^v(x) = k e^{-|u|^v} \tag{8}$$

Returning to equation Eqn. 6, it will be recognized that, in each addend of the summation represented by the dummy variable "x," is present a subtrahend $$t_j = u^T s_j, j = 1, \ldots, H \tag{9}$$

which values essentially represent threshold values for the nodes 21(j) of the first hidden layer 13, and which are also determined during training. The threshold values for the nodes 22(k) of the second hidden layer 14, on the other hand, also from equation Eqn. 6, are identically zero. Since, in equation Eqn. 6 the summation in the exponential extends from one to "H", the equation also teaches that the number of first layer nodes 21(j) of the first hidden layer, connected to each node 22(k) in the second hidden layer is also "H". Since the number of second layer nodes 22 corresponds to the number of components in the outcome classes, identified as "K," and since further each node 21(j) in the first hidden layer is connected to only one node 22(k) in the second hidden layer, as suggested by equation Eqn. 6, the number of nodes 21(j) in the first hidden layer corresponds to the value "H" multiplied by "K".

Further characterizing the architecture of the neural network 10, equation Eqn. 6 also provides the basis for determining the weights $w_1(i,j)$ between an input terminal 20(i) and a node 21(j) of the first hidden layer. From that equation, it is clear that such weights correspond to $$w_1(i,j) = [S_{ij}]; (i=1, \ldots, N; j=1, \ldots, H) \tag{10}$$

(that is, the "j-th" component of the vector $s_j$). The interconnection weights $w_2(j,k)$ between the nodes 22(j) and 23(k) of the first and second hidden layers 13 and 14, on the other hand are given by $$w_2(j,k) = A_j W(s_j) \ (j=1, \ldots, H) \text{ for all } k=1, \ldots, K \tag{11}$$

With the nodes 21(j) and 22(k) of the first and second hidden layers 13 and 14 as described above, and the respective interconnection weights $w = (i,j)$ between the input terminals 20(i) and first layer nodes 21(j) and $w_2(j,k)$ between the first layer nodes 21(j) and second layer nodes 22(k) also as described above, the architecture of the output nodes 23(l) and interconnection weights $w_3(k,l)$ will now be described. As noted above, each output node 23(l) in the output layer 12 receives the likelihood values from all of the nodes 22(k) and generates in response a value indicating the likelihood that the input vector X is properly classified in the class associated with the respective output node 23(l).

As in the above, "K" corresponds to the number of population components [corresponding to the number of nodes 22(k) in the second hidden layer 14] in the different outcome classes of the neural network 10, and if there are "L" possible output classes which corresponds to the number of output nodes 23(l)], the output of each output node 23(l) will be some combination of the K components from second layer nodes 22(k). If m(k,l) denotes the mixing proportion of the output from the "k-th" second layer node 22(k) in the output of an output node 23(l), the proportions m(k,l) will be non-negative and given by $$\sum_{k=1}^{K} m(k,l) = 1. \tag{12}$$

Using the likelihood function in equation Eqn. 1, the output of an output node 23(l) will be given by $$g_l(X) = \sum_{k=1}^{K} m(k,l) p_k(x), \tag{13}$$

in which case the classification provided by the neural network will be that associated with the output node 23(l) for which the result given by equation Eqn. 13 is a maximum. The mixing proportions m(k,l) thus correspond to the weights ws(k,l) and will be determined during training. Since the classification provided by the neural network corresponds to the output node 23(l) for which the result in equation Eqn. 13 is a maximum, the output nodes 23(l) should not and need not use a non-linear function in generating their outputs.

As noted above, a weighting function W(s) can be determined during training. If, however, the likelihood function p(X) is known a priori, the weighting function can be determined as follows, if the weighting function W(s) and p(X) are continuous functions related as defined in equation Eqn. 1. For each integer "n" greater than or equal to zero, if the number of dimensions "N" is greater than or equal to three $S_n^1(s)$ (l=1, 2, ..., δ) represents a set of orthonormal surface harmonics of degree "n," where the integer δ is defined by $$\delta = \frac{(2n + N - 2)(n + N - 3)!}{(N - 2)! n!}. \tag{14}$$

Because W(s) is a continuous function, it can be expressed using the infinite series $$W(s) = \sum_{n=0}^{\infty} \sum_{l=1}^{n} c_{n,l} S_n^l(s), \tag{15}$$

which is a convergent orthonormal series. In the expression contained in equation Eqn. 15, the coefficients $c_{n,l}$ are to be determined, as described by the following.

If ε is deemed to be a point on the surface of the unit sphere $S_N$, corresponding to a vector normal to the surface of the unit sphere, the function £ (ε) can be defined by the surface integral $$£(\epsilon) = \int k^T s |^v W(s) dS_N(s). \tag{16}$$

Using equation Eqn. 15 in equation Eqn. 16 provides the resulting expression $$£(\epsilon) = \sum_{n=0}^{\infty} \sum_{l=1}^{n} \sigma_n c_{n,l} S_n^l(\epsilon), \tag{17}$$

where the constants $\sigma_n$ are real numbers given by the Riemann integral $$\sigma_n = \frac{2\pi^{\frac{N-1}{2}}}{\Gamma\left(\frac{N-1}{2}\right)} \left[ C_n^{\frac{N-2}{2}}(1) \right]^{-1} \int_{-1}^{1} |x|^v C_n^{\frac{N-2}{2}}(x)(1-x^2)^{\frac{N-3}{2}} dx. \quad (18)$$

In equation Eqn 18 the function $C_n^\alpha(x)$ represents the Gegenbauer polynomial of degree "n" and parameter $\alpha$ greater than (−1). Since, in equation Eqn. 17, the values of $\delta_n$ are zero for odd values of "n," the outer sum in equation Eqn. 17 has non-zero contributions only for even values of "n." For even values of "n," the Riemann integral in equation Eqn. 18 can be evaluated using well known tools in numerical analysis, or by application of standard numerical quadrature rules.

Returning to equations Eqn. 1 and Eqn. 16, the function £($\epsilon$) can also be defined as $$£(\epsilon) = (X^T X)^{-\frac{v}{2}} [\log k - \log \rho(X+u)]^{\frac{v}{n}} \quad (19)$$

where $\epsilon = X/(X^T X)^{1/2}$. Expanding equation Eqn. 19 into an orthonormal series of spherical harmonics $S_n^l(\epsilon)$ provides the expression $$£(\epsilon) = \sum_{n=0}^{\infty} \sum_{l=1}^{n} a_{n,l} S_n(\epsilon) \quad (20)$$

where the coefficients $\{a_{n,1}\}$ are determined by the surface integrals over the unit sphere $S_N$ $$a_{n,l} = \int £(\epsilon) S_n^l(\epsilon) dS_N(s). \quad (21)$$

The sum in equation Eqn. 20 has non-zero contributions only for even values of "n." This follows from the fact that the values of the coefficients $\{a_{n,1}\}$ for odd values of "n" are all zero, which, in turn, results from the fact that the function £($\epsilon$) is zero for odd values of "n." As with equation Eqn. 18, the coefficients $\{a_{n,1}\}$ can be evaluated analytically, or by use of a conventional numerical quadrature rule for integration on the sphere $S_N$. By inspection of the equations 17 and 20, the coefficients $c_{n,1}$ are given by $$c_{n,1} = \frac{1}{\sigma_n} a_{n,l} = \frac{1}{\sigma_n} \int £(\epsilon) S_n^l dS_N(s), \quad (22)$$

where the integral is a surface integral over the unit sphere $S_N$. As noted above in connection with equation Eqn. 15, the coefficients $c_{n,1}$ determine the weighting function W(s) used in determining the interconnection weights $w_2(j,k)$ between the nodes 22(j) and 23(k) of the first and second hidden layers 13 and 14, given by Eqn. 11.

The values of the weights and threshold values of the neural network 10 described above in connection with FIG. 1 which are identified above as to be determined by training may be determined in a similar manner as that described in the aforementioned Streit application, application Ser. No. 08/499,336, entitled A Neural Network for Maximum Likelihood Classification with Supervised and Unsupervised Training Capability, incorporated by reference.

The invention provides a number of advantages. As described in the aforementioned Streit application, domains in which outcome classes are characterized by mixtures of multivariate densities, with each of the component populations having non-Gaussian distributions, can often be approximated by a function of component populations each of which exhibit a Gaussian distribution, and neural networks derived using the Gaussian likelihood functions embodying the architecture are described in, for example, the aforementioned Streit application. Such neural networks will be fairly complicated, and the instant invention provides a much simpler neural network architecture for use in domains in which outcome classes are characterized by mixtures of multivariate densities whose component populations have non-Gaussian distributions.

Additionally, the neural network of the present invention provides the advantage that the first hidden layer and the interconnection weights between inputs and the first layer are "universal" for all Gaussian and non-Gaussian radially symmetric populations, where universal is defined in the following sense:

(1) Each of the K components corresponding the second layer nodes has inputs from H first layer nodes.

(2) The H nodes are identical (universal) for each of the K components in that a. The thresholds are determined by $t_i = u^T s_i$;

b. The interconnection weights between the input layer and the first layer are the components of the grid vector $s_i$ on the unit sphere $S_N$.

c. The points $s_i$ are independent of the training set and algorithm, the number of outcome classes L and components K.

The preceding description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A neural network for classifying input vectors to an outcome class comprising:

an input layer comprising a plurality of input terminals each for receiving a component of an input vector;

a first hidden layer including "H" first layer nodes each connected to the input terminals for receiving the input vector components from the input terminals and for generating a first layer output value representing a selected first layer power of the absolute value of the sum of the difference between a function of each input vector component and a threshold value, wherein, for each first layer node, the threshold value is determined as $t_i = u^T s_i$, where "u" is a mean vector of training input vectors used to train the neural network during the training operation, "T" represents a matrix/vector transpose operation, and "$s_i$" represents a vector defining a point on an H-component grid defined on a unit sphere having a number of dimensions corresponding to the number of components of an input vector;

a second hidden layer including a plurality of second layer nodes each for generating an outcome class component value, each second layer node being connected to predetermined ones of the first layer nodes and generating in response to the first layer output values an outcome class component value representing a function related to the exponential of the negative square of the sum of first layer output values, the sum being raised to a selected second layer power corresponding to a second layer power value divided by the first layer power; and an output layer comprising a plurality of output nodes each associated with an outcome class, each output node receiving a plurality of outcome class component values, each associated with an outcome class component and each representing a contribution of the outcome class component to the outcome class determination, each output node performing a summation operation in connection with the value of product of each outcome class component and an associated outcome class component weighting value to generate an outcome class value, the collection of outcome class values from all of the output nodes identifying the outcome class associated with the input vector.

2. A neural network as defined in claim 1 in which the function of each input vector component applied by the "j-th" first layer node ("j" is an integer from "1" to "H") to an input vector component value received from the "i-th" input terminal ("i" is an integer from "1" to "N") in said first layer is the "j-th" component of $w_1(i,j)=s_{ij}$, where and "$s_{ij}$" represents a the "j-th" component of vector defining an "i-th" point on an H-component grid defined on a unit sphere having a number of dimensions corresponding to the number of components of an input vector.

3. A neural network as defined in claim 1 in which the outcome class component values generated by the second layer nodes reflect threshold values determined by training.

4. A neural network as defined in claim 1 in which the second layer nodes all apply the diverse weighting values in connection with first layer output values they receive from the first layer nodes in generating the respective outcome class component values.

5. A neural network as defined in claim 1 in which the outcome class value generated by each output node in the output level does not reflect a threshold value.

6. A neural network for classifying input vectors to an outcome class comprising:

an input layer comprising a plurality of input terminals each for receiving a component of an input vector;

two hidden layers, including (i) a first hidden layer including a plurality of first layer nodes each connected to the input terminals for receiving the input vector components from the input terminals and for generating a first layer output value according to a first layer nonlinear function representing a first layer power of the absolute value of the sum of the difference between a function of each input vector component and a threshold value, and (ii) a second hidden layer including a plurality of second layer nodes each for generating an outcome class component value, each second layer node being connected to predetermined ones of the first layer nodes and generating in response to the first layer output values an outcome class component value according to a second layer nonlinear function related to the exponential of the negative square of the sum of first layer output values, the sum being raised to a second layer power corresponding to a second layer power value divided by the first layer power, wherein the outcome class component value conforms to a likelihood function p(X) given by $$p(X) = ke^{[\int (X-u)_s^T W(s) dS_N(s)]^{\frac{\eta}{v}}}$$

where X is the input vector received by the input layer, u is a mean vector of the set of possible input vectors, where k, η and v are constants with values greater than zero, T represents the matrix/vector transpose operation, $S_N$ represents a unit sphere in N-dimensional space, s is a vector normal to the surface of unit sphere $S_N$, $dS_N(S)$ is a differential of surface of the unit sphere $S_N$, W(s) is a weighting function, and the integral is a surface integral over the unit sphere $S_N$; and an output layer comprising a plurality of output nodes each associated with an outcome class, each output node receiving a plurality of outcome class component values, each associated with an outcome class component and each representing a contribution of the outcome class component to the outcome class determination, each output node performing a summation operation in connection with the value of product of each outcome class component and an associated outcome class component weighting value to generate an outcome class value, the collection of outcome class values from all of the output nodes identifying the outcome class associated with the input vector.

7. A neural network as defined in claim 6 in which the outcome class component values generated by the second layer nodes reflect threshold values determined by training.

8. A neural network as defined in claim 6 in which the second layer nodes all apply the diverse weighting values in connection with first layer output values they receive from the first layer nodes in generating the respective outcome class component values.

9. A neural network as defined in claim 6 in which the outcome class value generated by each output node in the output level does not reflect a threshold value.

* * * * *